US012190070B2

(12) United States Patent
Jepperson et al.

(10) Patent No.: US 12,190,070 B2
(45) Date of Patent: Jan. 7, 2025

(54) DYNAMIC MEETING ATTENDEE INTRODUCTION GENERATION AND PRESENTATION

(71) Applicant: INTERNATIONAL BUSINESS MACHINES CORPORATION, Armonk, NY (US)

(72) Inventors: Jacob Ryan Jepperson, St. Paul, MN (US); Zachary A. Silverstein, Georgetown, TX (US); Spencer Thomas Reynolds, Austin, TX (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 289 days.

(21) Appl. No.: 17/808,166

(22) Filed: Jun. 22, 2022

(65) Prior Publication Data
US 2023/0419047 A1 Dec. 28, 2023

(51) Int. Cl.
| | |
|---|---|
| *G06F 40/40* | (2020.01) |
| *G06F 40/166* | (2020.01) |
| *G06F 40/30* | (2020.01) |
| *G10L 13/02* | (2013.01) |
| *G10L 15/18* | (2013.01) |
| *G10L 15/22* | (2006.01) |
| *G06Q 10/1093* | (2023.01) |

(52) U.S. Cl.
CPC .......... *G06F 40/40* (2020.01); *G06F 40/166* (2020.01); *G06F 40/30* (2020.01); *G10L 13/02* (2013.01); *G10L 15/1815* (2013.01); *G10L 15/22* (2013.01); *G06Q 10/1095* (2013.01)

(58) Field of Classification Search
None
See application file for complete search history.

(56) References Cited

U.S. PATENT DOCUMENTS

| | | | |
|---|---|---|---|
| 7,617,160 B1 | 11/2009 | Grove | |
| 8,159,519 B2 | 4/2012 | Kurtz | |
| 8,312,082 B2 | 11/2012 | Balogh | |
| 8,786,666 B2 | 7/2014 | Shanmukhadas | |
| 9,407,867 B2 | 8/2016 | Shanmukhadas | |
| 10,148,712 B2 | 12/2018 | Lakshmanan | |
| 10,289,979 B2 * | 5/2019 | Gaucher | H04L 65/403 |

(Continued)

OTHER PUBLICATIONS

Floridi, Luciano, and Massimo Chiriatti. "GPT-3: Its nature, scope, limits, and consequences." Minds and Machines 30 (2020): 681-694. (Year: 2020).*

(Continued)

*Primary Examiner* — Douglas Godbold
(74) *Attorney, Agent, or Firm* — Steven M. Bouknight

(57) ABSTRACT

The embodiment may include dynamic introduction generation for a virtual meeting that may gather introduction data of a user. The embodiment may analyze the gathered introduction data using natural language processing to identify user features. The embodiment may capture the user features for a dynamic introduction statement based on determining a scheduled meeting. The embodiment may present the dynamic introduction statement and capture user features to update the dynamic introduction statement based on determining a live meeting.

17 Claims, 6 Drawing Sheets

(56) References Cited

U.S. PATENT DOCUMENTS

| | | | |
|---|---|---|---|
| 2009/0282107 A1* | 11/2009 | O'Sullivan | G06Q 10/00 |
| | | | 707/999.005 |
| 2011/0271197 A1 | 11/2011 | Jones | |
| 2012/0203845 A1* | 8/2012 | Lakshmanan | H04L 65/403 |
| | | | 709/206 |
| 2014/0195613 A1* | 7/2014 | Ogilvie | H04L 67/10 |
| | | | 709/204 |
| 2015/0127636 A1* | 5/2015 | Hofstetter | G06F 40/186 |
| | | | 707/722 |
| 2016/0028895 A1 | 1/2016 | Bell | |
| 2016/0156876 A1 | 6/2016 | Breedvelt-Schouten | |
| 2017/0214779 A1* | 7/2017 | Moran | G10L 15/26 |
| 2019/0155426 A1 | 5/2019 | Karam | |
| 2020/0260050 A1 | 8/2020 | Pell | |
| 2020/0349932 A1* | 11/2020 | Ogawa | G10L 13/08 |
| 2021/0375291 A1* | 12/2021 | Zeng | H04L 67/306 |
| 2021/0400142 A1 | 12/2021 | Jorasch | |
| 2022/0277395 A1* | 9/2022 | Sugrue | H04N 7/147 |
| 2022/0415317 A1* | 12/2022 | Flores | G06F 40/169 |
| 2024/0037345 A1* | 2/2024 | O'Brien | G06F 40/183 |

OTHER PUBLICATIONS

Alani, Harith, et al. "Automatic ontology-based knowledge extraction from web documents." IEEE Intelligent Systems 18.1 (2003): 14-21. (Year: 2003).*

Ambavi, Heer, et al. "BioGen: automated biography generation." 2019 ACM/IEEE Joint Conference on Digital Libraries (JCDL). IEEE, 2019. (Year: 2019).*

IBM, "Enterprise Video Platform and CMS," IBM.com, Accessed: Apr. 26, 2022, https://www.ibm.com/watson/media/internal-video-for-corporate-communications, 8 pages.

IBM, "IBM Watson Studio," IBM.com, Accessed: Apr. 26, 2022, https://www.ibm.com/cloud/watson-studio, 15 pages.

Mell et al., "The NIST Definition of Cloud Computing", National Institute of Standards and Technology, Special Publication 800-145, Sep. 2011, 7 pages.

* cited by examiner

DYNAMIC MEETING ATTENDEE INTRODUCTION GENERATION AND PRESENTATION

BACKGROUND

The present invention relates, generally, to the field of computing, and more particularly to utilizing natural language processing for enhancing a user experience.

Natural language processing (NLP) is a subfield of computer science and AI that deals with linguistics, information engineering, and artificial intelligence in order to provide interactions between computers and humans, typically in natural languages. Furthermore, NLP establishes approaches as to programming and designing computers in order to process and analyze large amounts of natural language data. Recent approaches utilize graphic processing units (GPUs) with integrated deep learning software or a vector-vector-matrix architecture (VVMA) that greatly reduces the latency of the NLP.

The user experience (UX) is related to efficiency and convenience of user interaction with and experiences from computer products, systems or services. Typically, UX includes perceptions of utility, ease of use, and efficiency. Improving user experience is important to most companies, designers, and creators when creating and refining products because negative user experience may diminish the use of the product and, therefore, any desired positive impact.

SUMMARY

According to one embodiment, a method, computer system, and computer program product for DIGP is provided. The embodiment may include dynamic introduction generation for a virtual meeting that may gather introduction data of a user. The embodiment may analyze the gathered introduction data using natural language processing to identify user features. The embodiment may capture the user features for a dynamic introduction statement based on determining a scheduled meeting. The embodiment may present the dynamic introduction statement and capture user features to update the dynamic introduction statement based on determining a live meeting.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
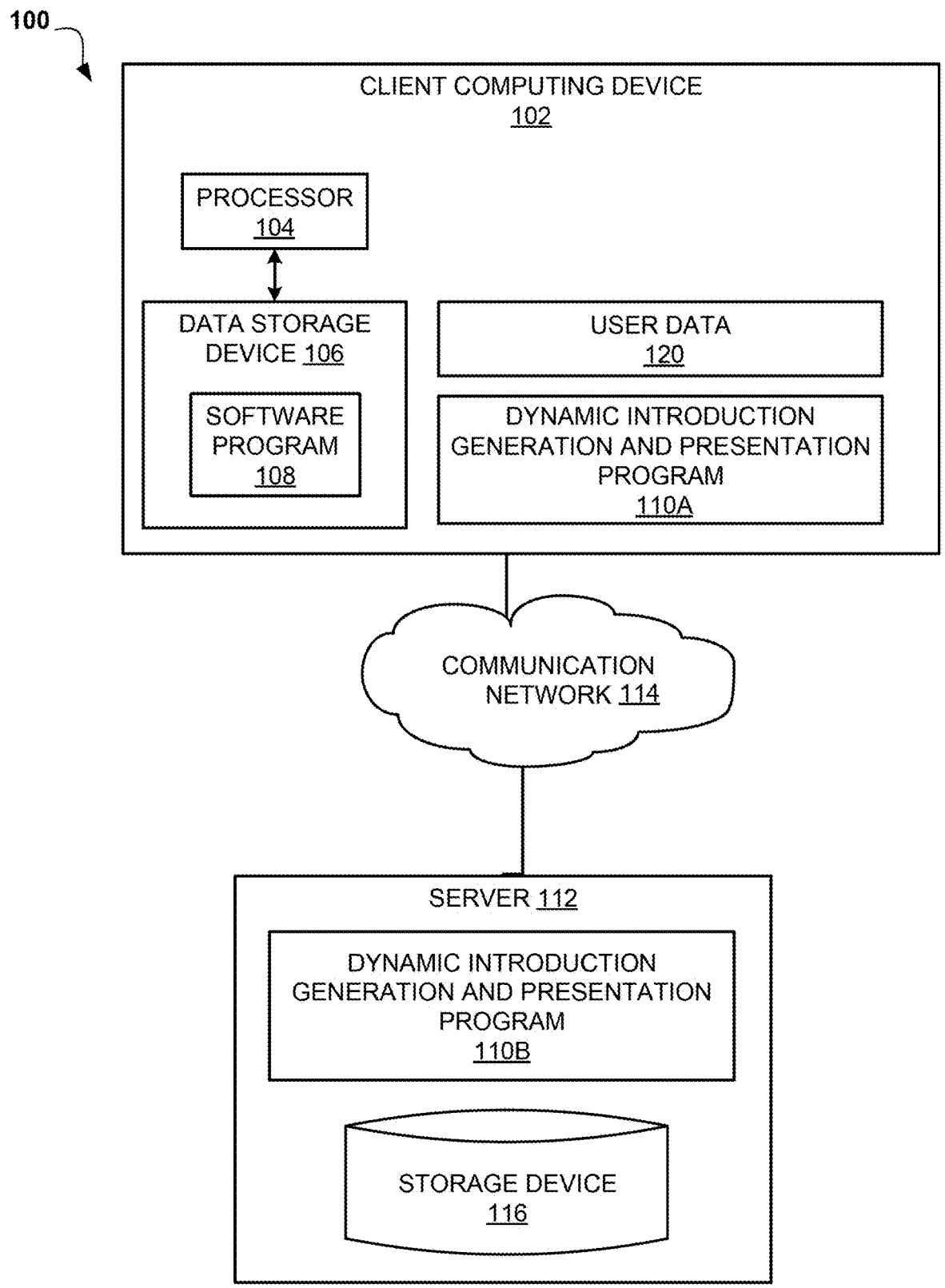
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to utilizing natural language processing for enhancing a user experience. The following described exemplary embodiments provide a system, method, and program product to, among other things, analyze introduction statements and store data to generate a dynamic introduction statement for a user based on information available from a virtual meeting such as topic and roles of the participants. Therefore, the present embodiment has the capacity to improve the technical field of computerized user experience (UX) by enabling automatic generation of dynamic user introduction reports during virtual meetings using text, voice and video.

As previously described, natural language processing (NLP) is a subfield of computer science and AI that deals with linguistics, information engineering, and artificial intelligence in order to provide interactions between computers and humans, typically in natural languages. Furthermore, NLP establishes approaches as to programming and designing computers in order to process and analyze large amounts of natural language data. Recent approaches are utilizing graphic processing units (GPUs) with integrated deep learning software or a vector-vector-matrix architecture (VVMA) that greatly reduces the latency of the NLP.

Typically, in order to successfully and efficiently manage a computerized meeting such as a video or audio conferences, it is frequently required that participants introduce themselves to enable collaboration and create an effective meeting environment that achieves the shared objective. Oftentimes, these meetings, whether internal or with outside customers, are limited on time or have a lot of participants. Introduction by each participant may waste valuable time, can be unstructured and unorganized, typically last longer than the agenda allows, and frequently takes time away from other critical topics or objectives of the meeting. Furthermore, participants may introduce themselves differently based on a variety of factors, such as topic, attendees, duration, etc. Skipping participant introductions may adversely affect participation and collaboration, thus adversely affecting the UX. As such, it may be advantageous to, among other things, implement a participant database based on prior introductions and generating an organized, dynamic introduction based on meeting topics and roles of the participants.

According to one embodiment, user-related data may be gathered from available sources, such as prior verbal user introductions, a user directory, and general user data. Then, the embodiment may analyze the gathered introduction data using natural language processing to identify key user features for the dynamic introduction statement, and based on a topic and roles of other participants, the user features may be organized in a structured user introduction that may be presented visually or using an audio device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to capture and analyze user data using NLP in order to generate a dynamic introduction of the user during virtual meetings.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and the server 112 may each individually host a dynamic introduction generation and presentation (DIGP) program 110A, 110B. In one or more other embodiments, the DIGP program 110A, 110B may be partially hosted on, in any combination of, the client computing device 102 and the server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108, user data 120 and the DIGP program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively. The user data 120 may be a database that aggregates information identified by the DIGP program 110A for dynamic introduction statement generation.

The server computer 112 may be a laptop computer, netbook computer, personal computer (PC), a desktop computer, or any programmable electronic device or any network of programmable electronic devices capable of hosting and running the DIGP program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the DIGP program 110A, 110B may be a program capable of capturing user data and prior introductions made by a user, analyze the data using NLP to generate dynamic introduction statement based on scheduled virtual meeting information. The dynamic introduction statement generation and presentation method is explained in further detail below with respect to FIG. 2.

Figure 2:
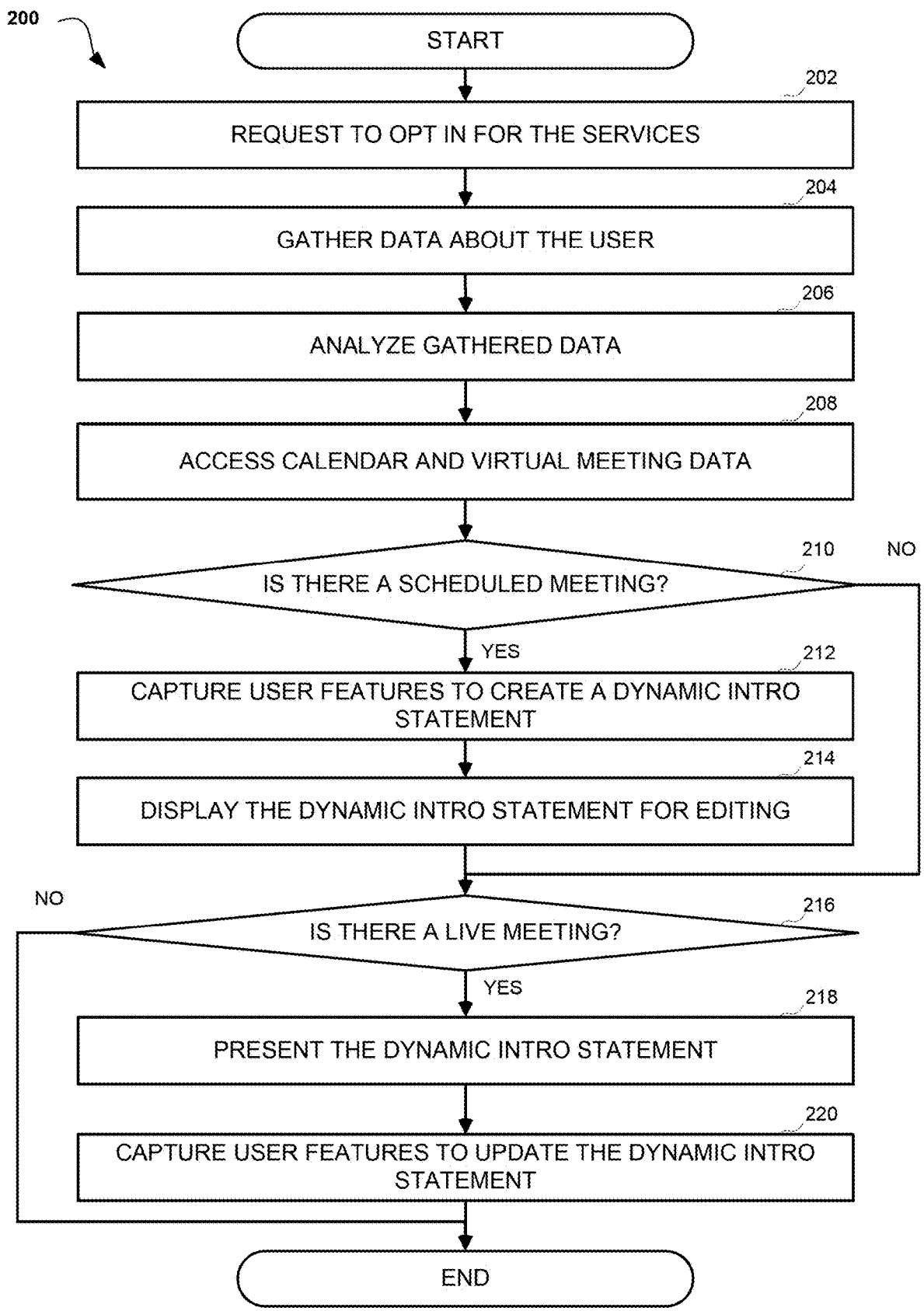
FIG. 2 is an operational flowchart illustrating a dynamic introduction generation and presentation process according to at least one embodiment.

Referring now to FIG. 2, an operational flowchart illustrating a dynamic introduction generation and presentation process 200 is depicted according to at least one embodiment. At 202, the DIGP program 110A, 110B requests to opt in for the services. According to an example embodiment, the DIGP program 110A, 110B may request each user to voluntarily opt in for the service during installation process and fill out data in user data 120 until the user opts out from the services or removes the DIGP program 110A, 110B. In another embodiment, the DIGP program 110A, 110B may request to opt in due to privacy law requirements.

Next, at 204, the DIGP program 110A, 110B gathers data about the user. According to an example embodiment, the DIGP program 110A, 110B may search for the available information that may be related to the virtual meetings. For example, the DIGP program 110A, 110B may determine the role of the user and an organization name from a user directory (e.g., LDAP server) or a user profile of the virtual meetings services. This data may be accessed by the DIGP program 110A, 110B using application programming interface (API). In another embodiment, the DIGP program 110A, 110B may access and download data from an available resume that may be searched on client computing device 102. In further embodiments, the DIGP program 110A, 110B may access previously recorded or stored meetings, social network databases, and digital messages that may contain information related to skillsets and responsibilities of the user. The DIGP program 110A, 110B may store the data as user data 120 in a repository, such as storage device 116, as text with links to original resources for future access and analysis.

Then, at 206, the DIGP program 110A, 110B analyzes the gathered data. According to an example embodiment, the DIGP program 110A, 110B may access user data 120 to extract topics and skillsets of the user using NLP, such as a GPT-3 type algorithm, and summarization AI, such as IBM Watson® (IBM Watson and all IBM Watson-based trademarks and logos are trademarks or registered trademarks of International Business Machines Corporation and/or its affiliates). Furthermore, the DIGP program 110A, 110B may transcribe videos and audio recordings using speech-to-text algorithms and using Named Entity Recognition (NER) and Entity Resolution (ER) techniques to extract introduction statements from the virtual meetings that were transcribed by the speech-to-text algorithms.

Next, at 208, the DIGP program 110A, 110B accesses calendar and virtual meeting data. According to an example embodiment, the DIGP program 110A, 110B may use an API in order to determine timeframe of the scheduled meeting, topics of the scheduled meeting, and roles of the participants invited to the meeting. The timeframe may be used for determining the size and length of the introduction. The topic may be used for determining the related skills to be displayed in the introduction. The roles of the participants may be used to identify whether the virtual meeting is an internal meeting or an external meeting that may affect privacy or classified information disclosure in the introduction. For example, the DIGP program 110A, 110B may utilize a Word2Vec approach to convert the topic and skills of the user into vectors and then utilizing distance of the topic vector from the skills identify the relevant skills that need to be included in the dynamic introduction.

Then, at 210, the DIGP program 110A, 110B determines whether a meeting is scheduled. According to an example embodiment, the DIGP program 110A, 110B may access a calendar using the API to identify whether there is a meeting scheduled for a predetermined timeframe. If the DIGP program 110A, 110B determines a meeting is scheduled (step 210, "YES" branch), the DIGP program 110A, 110B may continue to step 212 to capture user features to create a dynamic introduction statement. If the DIGP program 110A, 110B determines that no meeting is scheduled for a predetermined timeframe (step 210, "NO" branch), the DIGP program 110A, 110B may continue to step 216 to determine whether a meeting is currently occurring.

Next, at 212, the DIGP program 110A, 110B captures user features to create a dynamic introduction statement. According to an example embodiment, the DIGP program 110A, 110B may determine the topic of the scheduled meeting and the participants using an API that accesses data of the meeting software. The topic may be converted into a feature vector using techniques such as Word2Vec or using similar AI-based algorithms and compared to information in the user data 120 that may be previously converted to the multiple feature vectors by the same algorithmic method. The feature vectors may be analyzed and compared using linear algebra to identify feature vectors that are within a predetermined distance from the topic feature vector and thus relevant data may be gathered in the dynamic introduction statement. In another embodiment, the DIGP program 110A, 110B may search for prior introduction statements made by the same participants and, by converting the prior introduction statement to text using speech-to-text algorithms, identify user features for the dynamic introduction statement. In another embodiment, the DIGP program 110A, 110B may have a default dynamic statement format that is filled with the identified user features, such as name of the user, role of the user at the organization, and skillset relevant to the topic of the meeting arranged, in the order of a distance between the vector of the topic to the skill vectors after word embedding.

Then, at 214, the DIGP program 110A, 110B displays the dynamic introduction for editing. According to an example embodiment, the DIGP program 110A, 110B may display the dynamic introduction to a user using graphical user interface (GUI) and enable a user to change or amend the introduction as the user desires, based on receiving an input from a user. For example, the user may interact with a mouse, a keyboard, or a touchscreen to amend the dynamic introduction. Any amendments may be then looped to the word embedding algorithm in order to adapt it to the user preferences.

Next, at 216, the DIGP program 110A, 110B determines whether there is a meeting currently occurring. According to an example embodiment, the DIGP program 110A, 110B may access a meeting software using the API and check whether there is an ongoing meeting. In another embodiment, the DIGP program 110A, 110B may access a microphone and, if the user speaks, the DIGP program 110A, 110B may determine that a live meeting is occurring. If the DIGP program 110A, 110B determines there is a live meeting (step 216, "YES" branch), the DIGP program 110A, 110B may continue to step 218 to execute the dynamic introduction statement. If the DIGP program 110A, 110B determines that there is no ongoing live meeting (step 216, "NO" branch), the DIGP program 110A, 110B may terminate. In further embodiments, the DIGP program 110A, 110B may be executed in a loop and gather the user features and validate there is no meeting until terminated by the user.

Figure 4:
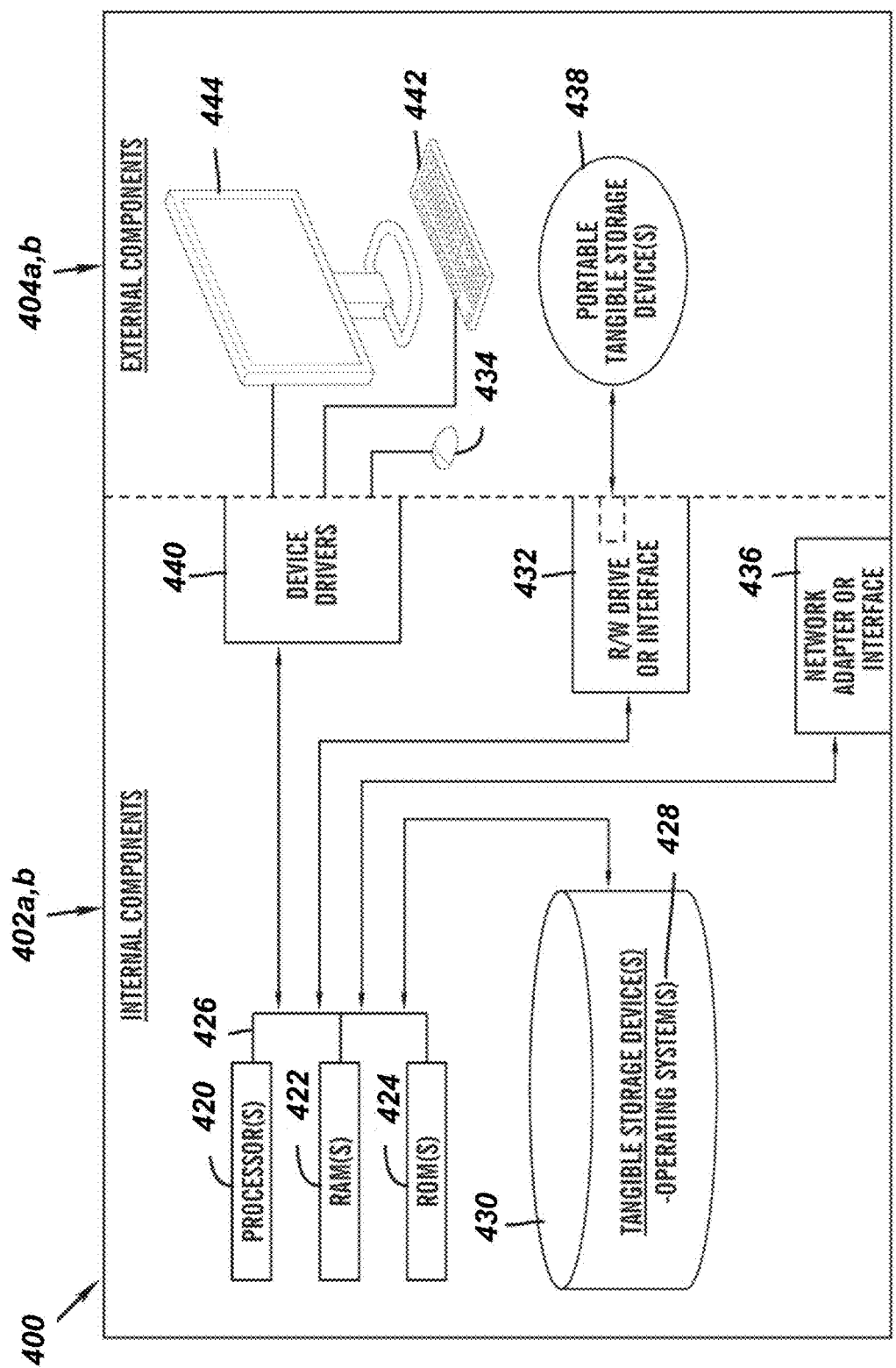
FIG. 4 is a block diagram of internal and external components of computers and servers depicted in FIG. 1 according to at least one embodiment.

Then, at 218, the DIGP program 110A, 110B presents the dynamic introduction statement. According to an example embodiment, the DIGP program 110A, 110B may generate the dynamic introduction statement and then display or play the dynamic statement based on requests of other participants, such as a user clicking an icon with a mouse. According to an example embodiment, the DIGP program 110A, 110B may generate the dynamic introduction statement based on a predefined format that requests specific fields to be filled in a predefined order, such as role, years of experience, and skill set. In another embodiment, the DIGP program 110A, 110B may generate the dynamic introduction statement based on the distance of the user features from the topic of the meeting, when the distance may be determined using word embedding or vectorization algorithms that may transfer words and sentences into vectors. In further embodiment, the DIGP program 110A, 110B may generate the dynamic introduction statement based on features of the introduction statement made by a user for similar audience in the past by extracting topics and sequence of topics from the previously recorded introduction. For example, FIG. 4 depicts a combination of both displaying the dynamic introduction with the ability to read it using text-to-speech techniques. In further embodiments, the DIGP program 110A, 110B may generate a video using user images and the audio representation of the dynamic introduction converted to speech using the text-to-speech algorithm.

Next, at 220, the DIGP program 110A, 110B captures user features to update the dynamic introduction statement. According to an example embodiment, the DIGP program 110A, 110B may, during runtime, analyze statements made by the user and, when the user negates or changes one of the user features, update the dynamic introduction based on the changes in the user features.

It may be appreciated that FIG. 2 provides only an illustration of one implementation and does not imply any limitations with regard to how different embodiments may be implemented. Many modifications to the depicted environments may be made based on design and implementation requirements.

Figure 3:
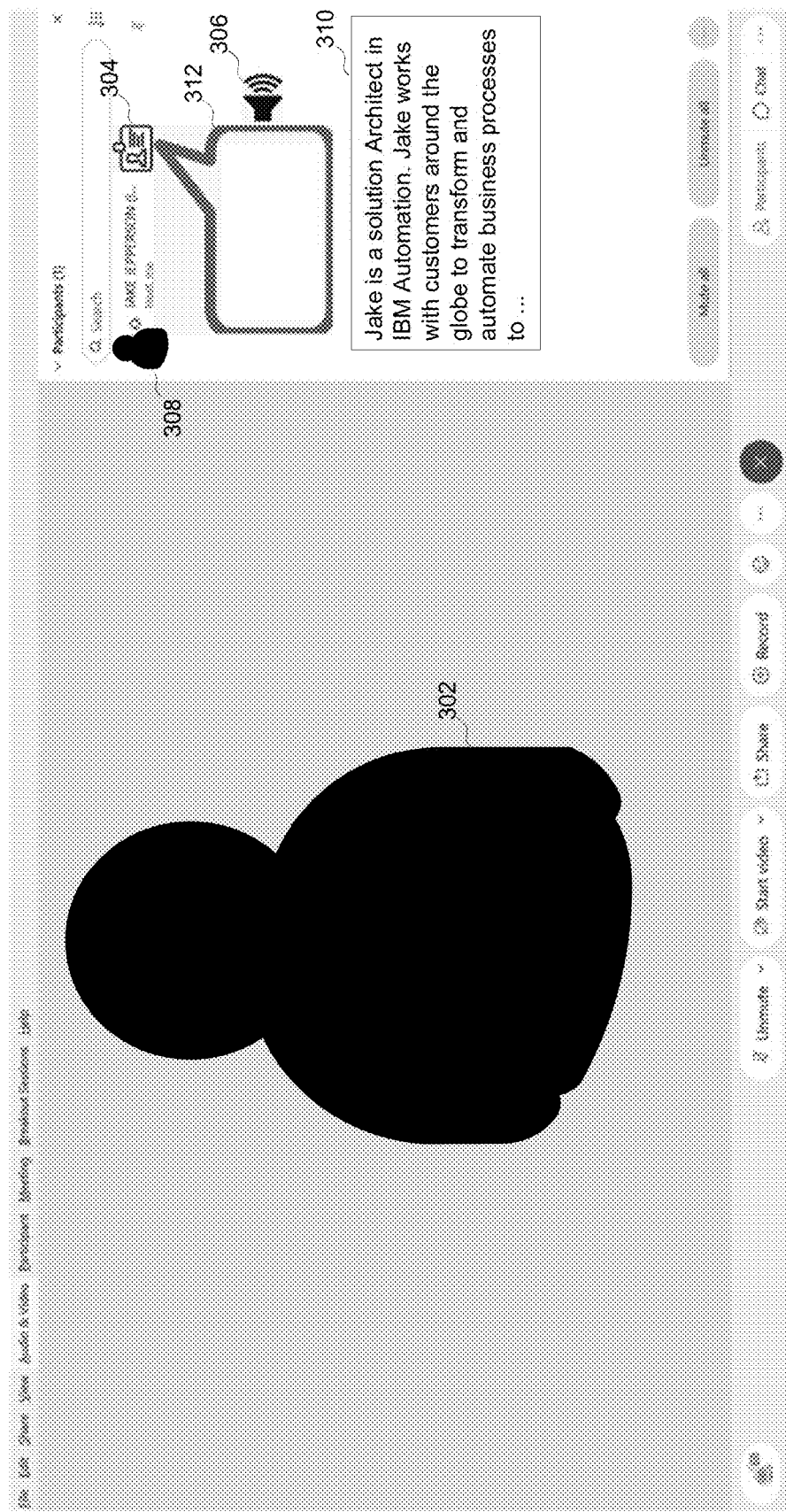
FIG. 3 is a block diagram illustrating a user interface of a dynamic introduction generation and presentation according to at least one embodiment.

FIG. 3 is a functional block diagram illustrating a user interface of a dynamic introduction generation and presentation in accordance with an embodiment of the present invention. The DIGP program 110A, 110B may display a photo of an active participant 302 where a current photo of the user 308 may have an introduction icon 304 that may be activated by clicking the icon 304 and display the introduction in box 312 while enabling audio playback of the introduction by clicking the icon 306. Furthermore, the introduction in box 312 may be edited by the user 308 in window 310.

FIG. 4 is a block diagram 400 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the DIGP program 110A in the client computing device 102 and the DIGP program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the DIGP program 110A, 110B, can be stored on one or more of the respective portable computer-readable tangible storage devices 438, read via the respective RAY drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the DIGP program 110A in the client computing device 102 and the DIGP program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the DIGP program 110A in the client computing device 102 and the DIGP program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
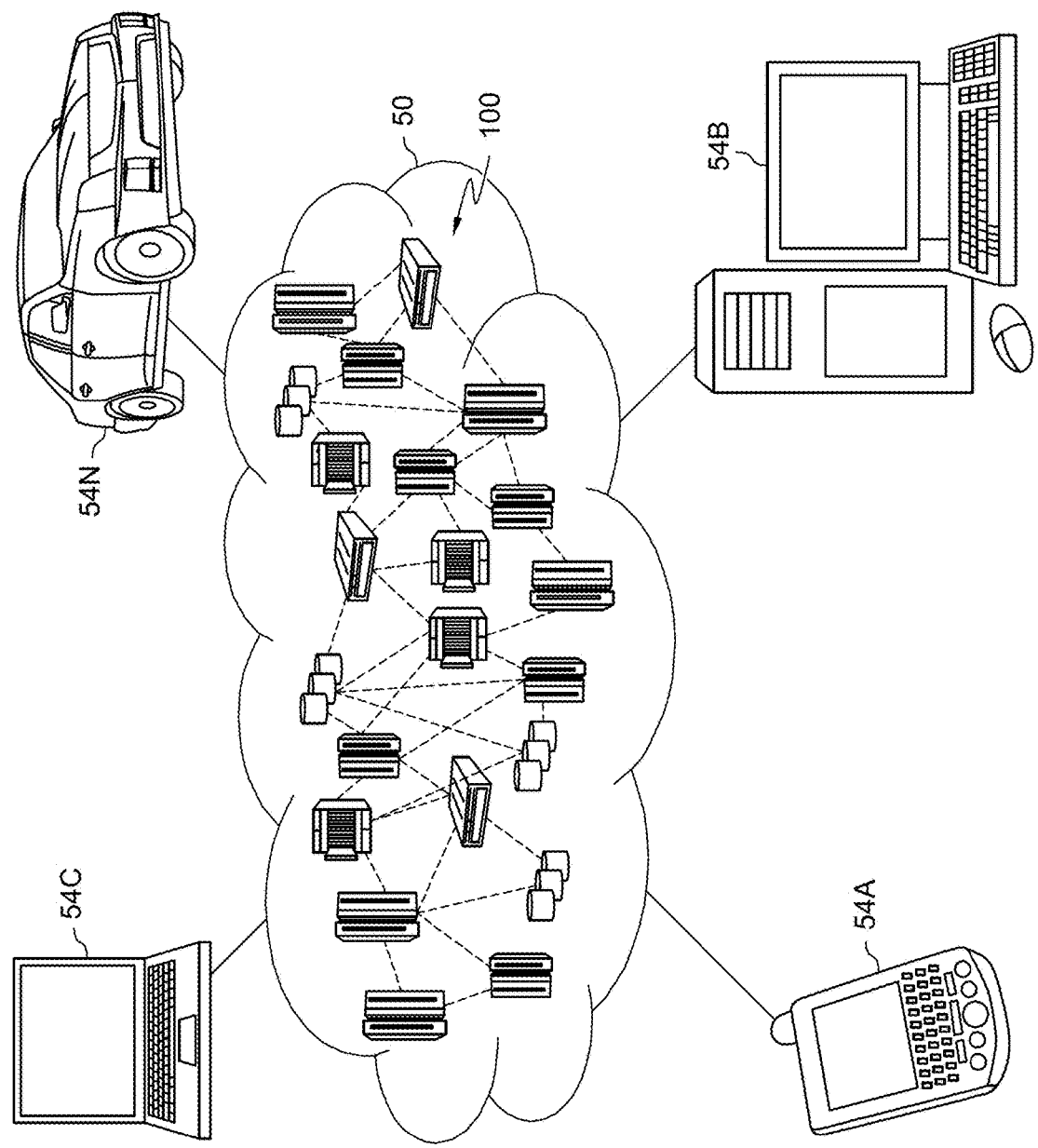
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
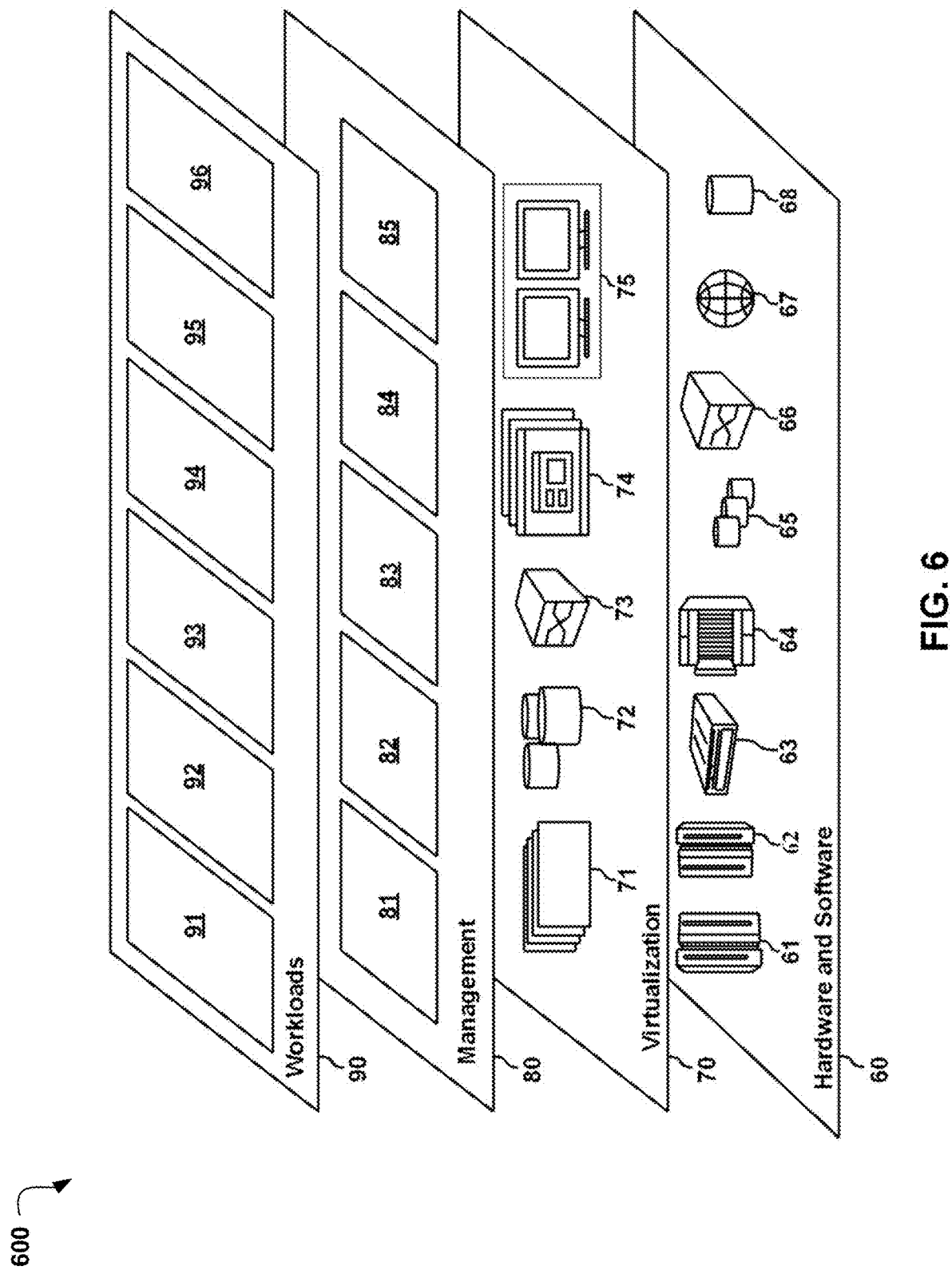
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic introduction generation 96. Dynamic introduction generation 96 may relate to analyzing user data to identify a user skillset and generate a dynamic introduction for a virtual meeting based on the information from the virtual meeting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for dynamic introduction generation for a virtual meeting, the method comprising:

identifying, using natural language processing and a Word2Vec algorithm, user features from gathered introduction data associated with a user;

based on determining a scheduled meeting, capturing the user features for a dynamic introduction statement;

generating the dynamic introduction statement based on the user features and a topic of the scheduled meeting; and based on determining a live meeting is occurring:
  presenting the dynamic introduction statement; and
  during runtime of the live meeting, automatically updating the dynamic introduction based on statements made by the user comprising changes to one or more of the user features.

2. The method of claim 1, further comprising:
displaying the dynamic introduction statement; and
editing the dynamic introduction statement based on receiving inputs from a user via a graphical user interface.

3. The method of claim 1, wherein the natural language processing uses a GPT-3 type algorithm.

4. The method of claim 1, wherein presenting the dynamic introduction statement further comprises:
  converting the dynamic introduction statement into a voice recording using a text-to-speech algorithm; and
  based on user input, playing the voice recording.

5. The method of claim 1, wherein capturing the user features for a dynamic introduction statement is based on a topic and one or more participants of the scheduled meeting.

6. The method of claim 1, wherein capturing user features to update the dynamic introduction statement is performed by converting the live meeting into text using a speech-to-text algorithm.

7. A computer system for dynamic introduction generation for a virtual meeting, the computer system comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
  identifying, using natural language processing and a Word2Vec algorithm, user features from gathered introduction data associated with a user;
  based on determining a scheduled meeting, capturing the user features for a dynamic introduction statement;
  generating the dynamic introduction statement based on the user features and a topic of the scheduled meeting; and
  based on determining a live meeting is occurring:
    presenting the dynamic introduction statement; and
    during runtime of the live meeting, automatically updating the dynamic introduction based on statements made by the user comprising changes to one or more of the user features.

8. The computer system of claim 7, further comprising:
displaying the dynamic introduction statement; and
editing the dynamic introduction statement based on receiving inputs from a user via a graphical user interface.

9. The computer system of claim 7, wherein the natural language processing uses a GPT-3 type algorithm.

10. The computer system of claim 7, wherein presenting the dynamic introduction statement further comprises:
  converting the dynamic introduction statement into a voice recording using a text-to- speech algorithm; and
  based on user input, playing the voice recording.

11. The computer system of claim 7, wherein capturing the user features for a dynamic introduction statement is based on a topic and one or more participants of the scheduled meeting.

12. The computer system of claim 7, wherein capturing user features to update the dynamic introduction statement is performed by converting the live meeting into text using a speech-to-text algorithm.

13. A computer program product for dynamic introduction generation for a virtual meeting, the computer program product comprising:
  one or more computer-readable tangible storage medium and program instructions stored on at least one of the one or more tangible storage medium, the program instructions executable by a processor, the program instructions comprising:
  program instructions to identify, using natural language processing and a Word2Vec algorithm, user features from gathered introduction data associated with a user;
  based on determining a scheduled meeting, program instructions to capture the user features for a dynamic introduction statement;
  program instructions to generate the dynamic introduction statement based on the user features and a topic of the scheduled meeting; and
  based on determining a live meeting is occurring:
    program instructions to present the dynamic introduction statement; and
    program instructions to, during runtime of the live meeting, automatically update the dynamic introduction based on statements made by the user comprising changes to one or more of the user features.

14. The computer program product of claim 13, further comprising:
  program instructions to display the dynamic introduction statement; and
  program instructions to edit the dynamic introduction statement based on receiving inputs from a user via a graphical user interface.

15. The computer program product of claim 13, wherein the natural language processing uses a GPT-3 type algorithm.

16. The computer program product of claim 13, wherein program instructions to present the dynamic introduction statement further comprises:
  program instructions to convert the dynamic introduction statement into a voice recording using a text-to-speech algorithm; and
  based on user input, program instructions to play the voice recording.

17. The computer program product of claim 13, wherein program instructions to capture the user features for a dynamic introduction statement is based on a topic and one or more participants of the scheduled meeting.

* * * * *